UNITED STATES PATENT OFFICE

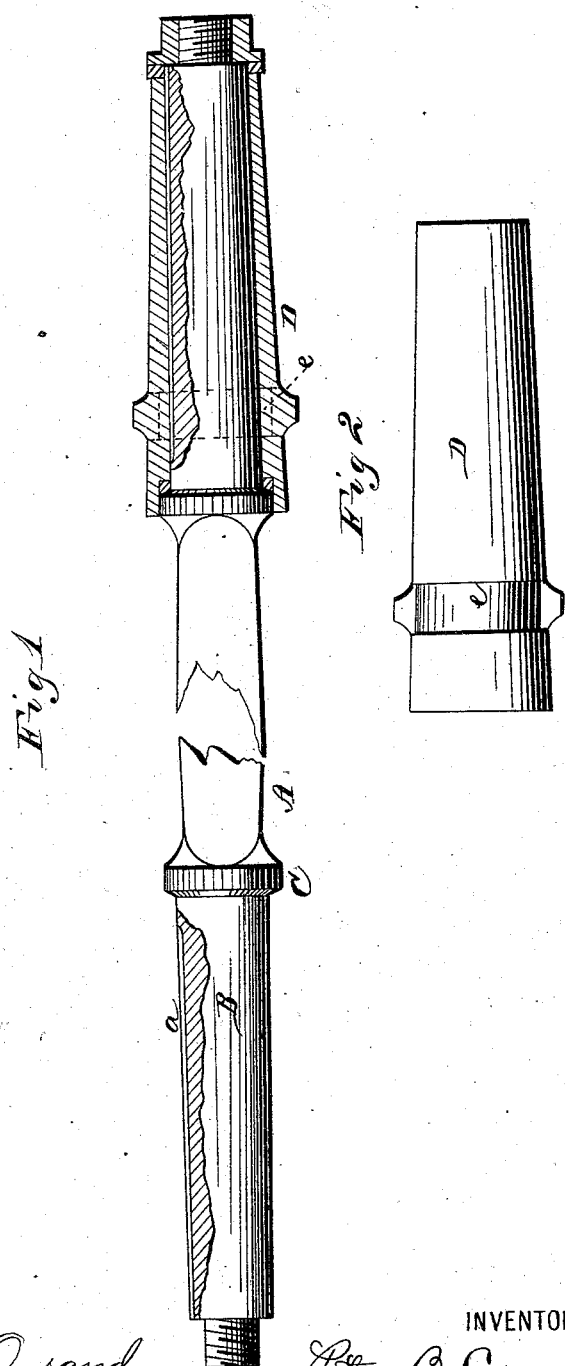

PETER B. CUNNINGHAM, OF FREEHOLD, (WOODSIDE P. O.,) ASSIGNOR TO P. B. CUNNINGHAM & CO., BETHLEHEM, PENNSYLVANIA.

IMPROVEMENT IN AXLE-BOXES FOR VEHICLES.

Specification forming part of Letters Patent No. 158,043, dated December 22, 1874; application filed August 8, 1874.

*To all whom it may concern:*

Be it known that I, PETER B. CUNNINGHAM, of Freehold, (Woodside P. O.,) in the county of Luzerne and in the State of Pennsylvania, have invented certain new and useful Improvements in Axles for Vehicles; and do hereby declare that the following is a full, clear, and exact description thereof, reference being had to the accompanying drawings, and to the letters of reference marked thereon, making a part of this specification.

The nature of my invention consists in providing the box of an axle with a recess near its largest or inner end, which extends between the lugs which hold the box in place in the wheel, as more fully hereinafter set forth.

In the annexed drawings making part of this specification, Figure 1 represents a plan view of a portion of the axle and the arm, as also a section of the box and a portion of the arm cut away. Fig. 2 represents a plan view of the box for the arm.

D represents the box, which is made in the usual manner, except that near its largest or inner end is formed a recess or groove, $e$, which extends between the lugs which hold the box in place in the wheel. The object of this recess is this: when the box is driven into the hub the wood of the hub swells and sinks into the recess, and thus serves to hold the box more securely. When this recess is used wedging of the box is unnecessary.

The box is formed with a shoulder in its inner end, and the shoulder on the axle, entering the box, rests against this shoulder, and the arm is thus protected from dust, &c.

The axle is preferably made as follows: A is the axle, the largest portion at its center, and tapering gradually from thence between the two arms. C C are the collars formed on the axle. Outside of the collars the axle is larger than the diameter of the axle between them, and is very slightly tapering. $a$ is a groove on the arm, which extends to the screw-thread on the arm.

Having thus fully described my invention, what I claim as new, and desire to secure by Letters Patent, is—

The axle-box D, having the recess $e$ formed in its outer periphery, as and for the purpose set forth.

In testimony that I claim the foregoing I have hereunto set my hand this 31st day of July, 1874.

PETER B. CUNNINGHAM.

Witnesses:
THOS. WEISS,
SAM. BRUNNER.